United States Patent

Mao et al.

[11] Patent Number: 5,972,537
[45] Date of Patent: *Oct. 26, 1999

[54] CARBON ELECTRODE MATERIAL FOR ELECTROCHEMICAL CELLS AND METHOD OF MAKING SAME

[75] Inventors: Zhenhua Mao, Duluth; Guoping Deng, Lawrenceville; Inna Kerzhner-Hal, Auburn; Anaba A. Anani, Lawrenceville, all of Ga.; Jinshan Zhang, Buffalo Grove, Ill.

[73] Assignee: Motorola, Inc., Schaumburg, Ill.

[*] Notice: This patent is subject to a terminal disclaimer.

[21] Appl. No.: 08/922,077

[22] Filed: Sep. 2, 1997

[51] Int. Cl.$^6$ .................................................. H01M 4/96
[52] U.S. Cl. .................................... 429/231.8; 429/231.4; 423/449.3
[58] Field of Search .................. 423/449.3, 460; 429/231.4, 231.8

[56] References Cited

U.S. PATENT DOCUMENTS

| | | |
|---|---|---|
| Re. 33,306 | 8/1990 | Hayashi et al. ........................ 429/194 |
| 1,287,634 | 12/1918 | Chaney . |
| 3,615,829 | 10/1971 | Sprague et al. ............................ 136/6 |
| 4,504,557 | 3/1985 | Filatovs et al. ......................... 429/192 |
| 4,615,959 | 10/1986 | Hayashi et al. ......................... 429/194 |
| 4,980,037 | 12/1990 | Hossain .................................. 204/130 |
| 5,416,056 | 5/1995 | Baker ...................................... 502/425 |
| 5,451,477 | 9/1995 | Omaru et al. ........................... 429/218 |
| 5,843,393 | 12/1998 | Denton, III et al. ................. 423/447.4 |

OTHER PUBLICATIONS

Rodriguez et al., "High–Temperature Carbons From Kraft Lignin", Carbon, vol. 34, No. 1, pp. 43–53. (No Month Available.), 1996.

*Primary Examiner*—Maria Nuzzolillo
*Assistant Examiner*—Carol Chaney
*Attorney, Agent, or Firm*—Felipe J. Farley

[57] ABSTRACT

A method (50) of fabricating a carbon material for use as an electrode in an electrochemical cell (10) includes the steps of carbonizing (62, 66) a lignin material to result in the carbon material and subsequently washing (74) the carbon material with acid.

12 Claims, 4 Drawing Sheets

5,972,537

CARBON ELECTRODE MATERIAL FOR ELECTROCHEMICAL CELLS AND METHOD OF MAKING SAME

TECHNICAL FIELD

This invention relates in general to the field of electrodes and electrode materials for electrochemical cells, and in particular to methods of synthesizing said electrodes and electrode materials.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device but at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid and nickel cadmium (NiCad), each of which have enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are appearing on the horizon which offer the promise of better capacity, better power density, longer cycle life, and lower weight, as compared with the current state of the art. The first such system to reach the market is the lithium ion battery which is already finding its way into numerous consumer products. Lithium polymer batteries are also receiving considerable attention, although they have not yet reached the market.

Lithium batteries in general include a positive electrode fabricated of, for example, a transition metal oxide material and a negative electrode fabricated of a carbon material such as graphite or petroleum coke. New materials for both electrodes have been investigated intensely because of the high potential for improved energy density. To date, however, most of the attention has been focused on the transition metal oxide electrode.

Carbon electrode materials are routinely prepared by using difunctional monomers as polymer precursors. Examples of such precursors include resins of furfural alcohol, phenyl, formaldehyde, acetone, furfuryl or furfuryl alcohol-phenyl copolymers. Other precursors include polyacrylonitrile, and rayon polymers, as disclosed in Jenkins, et al, *Polymeric Carbons-Carbon Fiber, Glass and Char*, Cambridge University Press, Cambridge, England, (1976). Materials which result from these processes are typically characterized by relatively low yields as well as high cost and low capacity.

More recently, multi-functional organic monomers and highly aromatic polyesters with aliphatic spacers have produced excellent carbons for use in lithium rechargeable electrochemical cells. Specifically, such materials are disclosed in, for example, U.S. patent application Ser. No. 08/534,427, filed Sep. 27, 1995 in the name of Zhang, et al, and assigned to Motorola, Inc., and Ser. No. 08/561,641 filed Nov. 22, 1995 in the name of Zhang, et al and assigned to Motorola, Inc., the disclosures of which are incorporated herein by reference.

While the materials disclosed in the foregoing U.S. patent applications have demonstrated excellent characteristics for purposes of electrochemical cells, they are the result of synthetic processing and therefore are not easily renewable. Moreover, those materials have less than ideal yield and less than optimal molecular weight.

Accordingly, there exists a need for improved carbon materials for use in electrochemical cell applications and processes for producing the improved carbon materials.

DETAILED DESCRIPTION OF THE PREFERRED EMBODIMENT

Figure 1:
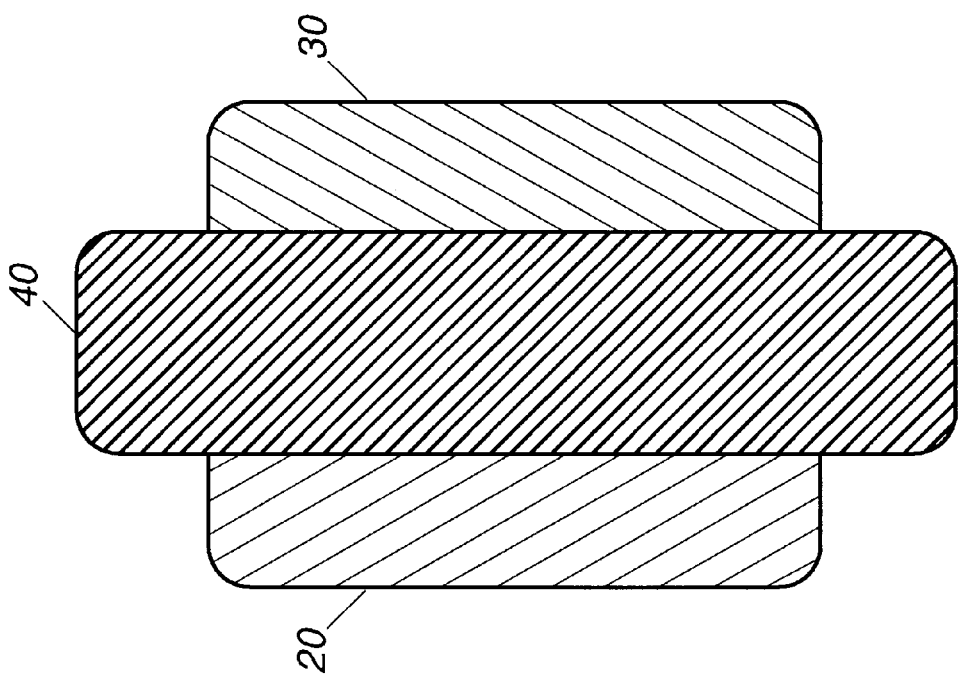
FIG. 1 is a schematic representation of an electrochemical cell including an electrode fabricated of a carbon material in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of a rechargeable electrochemical cell 10, such as a battery or an electrochemical capacitor, that includes a carbon electrode material fabricated in accordance with the instant invention. The electrochemical cell 10 includes a positive electrode or cathode 20, a negative electrode or anode 30, and an electrolyte 40 disposed therebetween. The cell negative electrode 30 is fabricated of a carbon material, such as that described in greater detail hereinbelow, coated onto a substrate. The positive electrode 20 of the cell 10 may be fabricated from substrate coated with a lithiated transition metal oxide that is well known in the art. For example, the positive electrode material may be fabricated of a material such as that described in commonly assigned, copending patent application Ser. No. 08/464,440, filed Jun. 5, 1995 in the name of Mao, et al and entitled "POSITIVE ELECTRODE MATERIALS FOR RECHARGEABLE ELECTROCHEMICAL CELLS AND METHOD OF MAKING SAME", the disclosure of which is incorporated herein by reference.

The electrolyte 40 disposed between the electrodes may be any of the electrolytes known in the art including, for example, $LiClO_4$ in propylene carbonate or a polyethylene oxide impregnated with a lithiated salt. The electrolyte 40 may also act as a separator between the positive and negative electrodes. The electrolyte may be aqueous, non-aqueous, solid state, gel, or some combination thereof. Alternatively, the electrolyte material may be fabricated in a manner such as that described in commonly assigned copending patent application Ser. No. 08/518,732 filed Aug. 24, 1995 in the name of Oliver, et al and entitled "BLENDED POLYMER GEL ELECTRODES", the disclosure of which is incorporated herein by reference.

In accordance with the instant invention, there is provided a method for making carbon materials for use as an electrode in an electrochemical cell such as that shown in FIG. 1. The carbon materials are substantially amorphous, although it will be appreciated that they could be partially or completely crystalline or amorphous but possessing crystalline inclusions. They may further include an amount of one or more modifier materials. The exact nature of the modifiers is dependent upon the specific application contemplated. According to the present invention, the carbon materials are washed with acid prior to use as an electrode active material.

Instead of the multi-functional or difunctional monomers or chars known in the prior art, the instant invention uses lignin as a starting material. Lignin is the by-product of paper and pulp industry, and, as will be described in greater detail hereinbelow, can yield a carbon material with capacities in excess of 500 milliampere hours per gram (mAh/g) and a yield in excess of 50%. Since lignin is generated at a rate of over 50 million metric tons a year, using lignin as a starting material to make an amorphous carbon electrode material for rechargeable electrochemical cells provides a tremendous economic advantage. Moreover, lignin is a renewable source; its existence in the biosphere is estimated to be $3 \times 10^{11}$ metric tons with an annual biosynthetic rate of $2 \times 10^{10}$ tons per year.

There are several types of lignin defined by relatively small variations in the chemical structure. The chief distinctions between lignins are: hard wood lignin versus soft wood lignin; the type of chemical pulping used to remove the lignin from raw wood; and subsequent chemical modifications. The type of lignin described for use herein is a byproduct of relatively soft wood, specifically Southern Yellow Pine. The chemical pulping process used to isolate the lignin is known as the "Kraft process". The Kraft process uses aqueous mixtures of sodium sulfide and sodium hydroxide to separate the cellulosic fibers from the lignin material. The degree of oxidation and/or degradation of the obtained lignins varies with the choice of the pulping process. Indeed, lignin exhibits slow, spontaneous oxidation and degradation even upon prolonged exposure to air. However, lignin products from the various pulping methods are substantially similar for purposes of the pyrolysis process described herein.

Other common pulping processing include the "green liquor" process that is usually used for the so-called hardwoods and that comprises treatment of the product with aqueous sodium carbonate and sodium sulfide; the acid sulfite process employing an aqueous sulfite salt of calcium, magnesium, sodium, or ammonium; mechanical and thermal mechanical pulping; and organo-solv pulping wherein an organic solvent is substituted for some or all of the water used in the aqueous methods.

The lignin used herein is subjected to a subsequent modification. Specifically, following the pulping process, the liquor comprising the aqueous lignin dispersion is spray-dried to obtain a powder, as is common in the industry. The resulting lignin has a molecular weight of approximately 1000 to 2000.

The lignins described herein include 3 cinnamyl alcohols. These alcohols are the monomeric precursors of the lignin and include p-coumaryl alcohol, coniferyl alcohol and sinapyl alcohol. The structural units of each of the three cinnamyl alcohols have oxyphenyl propyloxy skeletons, and differ from each other only in the number of methoxyl groups attached to the benzene ring. In the polymeric structure of lignin, these structural units are held together by a variety of ether and carbon/carbon bonds.

The biogenesis of lignins proceeds through the Shikimic acid pathway; thus, the same or similar hydroxyphenyl propenyl intermediates found in lignin are also present in other products which are the result of that acid pathway. Examples of such materials include flavanoids, suberin, betalains, coumarins, sporopollenins, and certain amino acids such as tyrosine, tryptophan and phenylalanine. Further, the oxyphenylpropyl backbone units characteristic of the cinnamyl alcohols described hereinabove can also be found in the first stages of decomposition of most carbon based botanical matter. Specifically, the humic substances such as humic acid, fulvic acid, and humin as well as cerogens may be useful. In addition, chemical degradation products of lignin, such as hibberts ketones, also have this useful structure. Accordingly, while the preferred material described herein is the result of pyrolysis of lignin, it is to be understood that the invention is not so limited. Rather, the invention disclosed herein relates to amorphous carbonaceous materials which are the result of pyrolysis of products of the Shikimic acid pathway and, in particular, substances possessing an oxyphenyl propyloxy backbone unit and which have been subsequently washed with acid to remove impurities.

Figure 2:
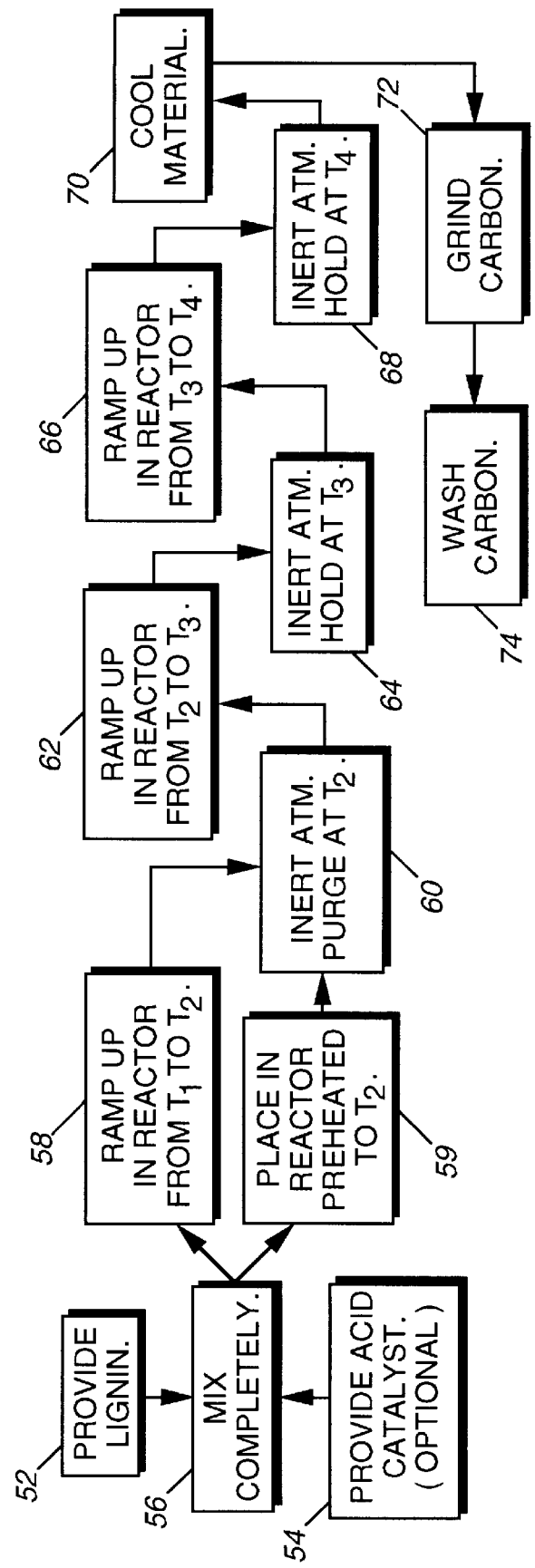
FIG. 2 is a flowchart illustrating the steps for preparing a carbon material in accordance with the instant invention.

Referring now to FIG. 2, there is illustrated therein a flowchart of steps for fabricating a carbon material in accordance with the instant invention. It will be appreciated that temperatures and ramp rates used to form the amorphous carbon material will vary with the furnace size and volume. Specifically, the temperatures and ramp rates described below are appropriate when using a three-inch ceramic tube furnace having an inner diameter of approximately 6.75 centimeters and an outer diameter of approximately 7.62 centimeters. The flowchart 50, at Box 52, illustrates the first step of the fabrication process and specifically the step of providing the lignin material. The lignin material provided at Box 52 is similar to that described hereinabove or, alternatively, can be any other of the other materials described herein.

Illustrated at Box 54 is the optional step of mixing the lignin material with an acid catalyst. It has been found that, when the lignin material is heated in the presence of an acid catalyst, the reaction of the lignin is more complete and results in an improved yield of the final product. Consequently, the carbon material may be formed with an acid present, although this is not necessary. Examples of preferred acids include acids selected from the group consisting of acetic acid, boric acid, phosphoric acid, p-toluene sulfonic acid, 4-amino benzoic acid, trifluoroacetic acid and combinations thereof. The acid, when used, may be present in amounts between 1 and 25 wt %.

Thereafter, as is illustrated in Box 56, the acid catalyst, when present, and the lignin material are thoroughly mixed, such as by a blender, a ball mill, or a jar mill. Once thoroughly mixed, the lignin/acid mixture is ready for the pyrolysis or carbonization process. It will be appreciated that the mixing step of Box 56 need not be performed when it is not desired to mix an acid with the lignin material.

The heating temperatures used in the pyrolysis/carbonization process can be determined by Thermogravimetric analysis (TGA) and differential scanning calorimetry (DSC), which have generally indicated that the pyrolysis/carbonization process should be a two-temperature one-step heating process.

The mixture of lignin and acid catalyst is placed in a furnace or reactor which is held at temperature $T_1$ or essentially room temperature. Thereafter, the furnace is ramped from room temperature up to a temperature $T_2$ which is generally between 100 and 150° C., and preferably about 120° C. Alternatively, the base temperature of the furnace can be 120° C. so that the temperature need not be ramped up from room temperature. This step is illustrated at Box 58 of the flowchart. Alternatively, as is illustrated in Box 59, the reactor may be preheated to temperature $T_2$. After placing the mixture of lignin and acid in the oven, and reaching temperature level $T_2$, the atmosphere inside the reactor is purged with an inert gas so as to yield an inert atmosphere as illustrated by Box 60. Examples of an inert atmosphere used in connection herewith include argon, nitrogen, $CO_2$, and helium. In a preferred embodiment, the inert atmosphere is argon.

After flooding the reactor in an inert atmosphere, the temperature inside the reactor is ramped up from the $T_2$ level to a $T_3$ level. The $T_3$ temperature is typically the temperature at which the lignin, or the lignin mixture, is fully cured, such as between about 300° C. and 400° C. Preferably, the $T_3$ temperature is approximately 350° C. The rate at which the temperature is ramped from $T_2$ level to the $T_3$ level is typically between 0.1 and 5° C. per minute and preferably 0.5° C. per minute. This step is illustrated in Box 62 of the flowchart. The mixture is held at the $T_3$ temperature for a period of time of between three and twelve hours, preferably approximately six hours. This step is illustrated at Box 64 of the flowchart.

Thereafter, at Box 66, the temperature in the oven is ramped up to the $T_4$ temperature level. The $T_4$ temperature level is preferably between approximately 800° C. and 1200° C. and most preferably about 1000–1020° C. The temperature is ramped up to the $T_4$ level at a rate of approximately 1–5° C. per minute, and preferably 2.5° C. per minute. Next, as is illustrated in Box 68, the mixture is held at the $T_4$ level in an inert atmosphere for a period of time of between 0.5 and 5 hours and preferably about 1 hour. As shown in Box 70, the reactor or furnace is then turned off and the mixture is allowed to cool to room temperature. Cooling typically occurs in 4–6 hours time. The carbon material is then comminuted, at Box 72, such as by jet milling or other grinding methods. Preferably, the particle size of the resulting carbon material is between 5 and 50 microns. Referring next to Box 74, the ground carbon material is washed in acid in accordance with the present invention for the purpose of removing impurities.

Carbon materials from natural sources such as lignin generally contain a significant amount of impurities, e.g., alkaline metal salts and other heavy metals or metal salts. When such a carbon is used as the negative electrode material for a rechargeable lithium cell 10 (FIG. 1), the impurities could cause degradation of cell performance. For example, an alkaline metal salt, such as sodium salt, could dissolve into the electrolyte, and sodium ions could be inserted into the carbon or the active material on the positive electrode during charge and discharge. Consequently, the crystalline structures of both electrode active materials could change, and the capacity of such materials for storing lithium ions could decrease. Additionally, when the carbon material contains heavy metal impurities, the metals could act as catalytic sites for electrolyte decomposition. Therefore, purification of the carbon is desirable to produce a high performance cell.

The material resulting from the process illustrated hereinabove with respect to FIG. 2 is a substantially amorphous material which is characterized by a d-spacing of the (002) peak of between 3.8 angstroms and 4.2 angstroms. The true density of this material is on the order of approximately <1.6 $g/cm^3$ up to approximately 2.2 $g/cm^3$. The capacity of the material disclosed herein is typically in excess of approximately 400 mAh/g.

The instant invention may be better understood by referring to the examples provided below.

EXAMPLE I 270 grams (g) of a carbon material were purified as described below. The carbon material was produced from a lignin material, using a 19.05 centimeter (cm) stainless steel furnace and processed using a hammer mill and a Prater mill. Before washing, the material was found to contain a significant amount of Fe, sodium, sulfur, and potassium. The carbon powder was first poured into a 1 liter beaker. Deionized water and 50 milliliters (ml) of 32% HCl solution were added to the beaker so that the solution reached the 500 ml mark. The carbon solution was heated at about 80° C. for one hour while being stirred. The carbon was washed several times with deionized water until the filtration solution became nearly neutral. Subsequently, the carbon material was dried and heated at 1,010° C. for 1 hour. The filtration solution was vaporized, and the residual was collected to determine the amount of remaining impurities. About 24.5 g of solid residual material were obtained from the filtration solution. This represents 9% of the total initial weight and indicates that amount of soluble material in the carbon is significant.

EXAMPLE II 200 g of a carbon material were made in a quartz tub furnace from the same lignin used in Example I. This batch of carbon included less Fe than in the material of Example I (prior to washing) but also included a large amount of sodium, potassium, and sulfur contaminants. The carbon powder was washed using an acid solution in the same manner as set forth in Example I. 4.2 g of residual were obtained from the filtration solution. Compared to the washed carbon of Example I, the resulting carbon material contained fewer impurities. A chemical analysis of the solid residual indicated that it contained 40 wt % Na. Since an HCl solution was used to wash the carbon, it is likely that the solid residual salt was primarily NaCl having 39.3 wt % Na. Impurities before and after washing this carbon material are shown in the table below. It will be appreciated that the below impurity levels are for our internally washed Example II carbon only and that the impurity levels could vary depending upon washing procedure, washing equipment, and different carbon batches.

TABLE 1

| Carbon Impurities for Example II Material | | | | | | | |
|---|---|---|---|---|---|---|---|
| Impurities in parts per million (ppm) | | | | | | | |
| Carbon Sample | Na | K | Fe | Co | Cr | Al | N | SO$_4$ |
| Washed | 3,116 | 212 | 17 | <3 | <3 | 12 | 5,202 | 35 |
| Unwashed | 7,754 | 291 | 578 | <3 | 3 | 7 | 4,588 | 72 |

Two types of electrochemical tests were performed to determine whether acid washing improves the performance of a carbon material manufactured from the lignin. The first sets of experiments were performed with half-cells to determine the specific capacities of the carbon materials of Examples I and II. The second sets of experiments were performed to compare the cycleability of complete cells with washed and unwashed carbon as the negative electrode materials.

Half-cell Data

Table 2 shows a comparison of the first cycle charge efficiencies and the reversible capacities for the two carbon materials described in Examples I and II. As shown, for each batch of carbon material, acid washing increased both capacity and first cycle efficiency. It is believed that acid washing causes removal of inactive material without changing the electrochemical property of the materials.

TABLE 2

Carbon Impurities for Carbon Material

| Carbon Sample | 1st Cycle Efficiency (%) | Reversible Capacity (mAh/g) |
| --- | --- | --- |
| Ex. 1 - unwashed | 64.7 | 436 |
| Ex. 1 - washed | 66.4 | 473 |
| Ex. 2 - unwashed | 61.3 | 388 |
| Ex. 2 - washed | 67.5 | 440 |

Full Cell Tests

Figure 3:
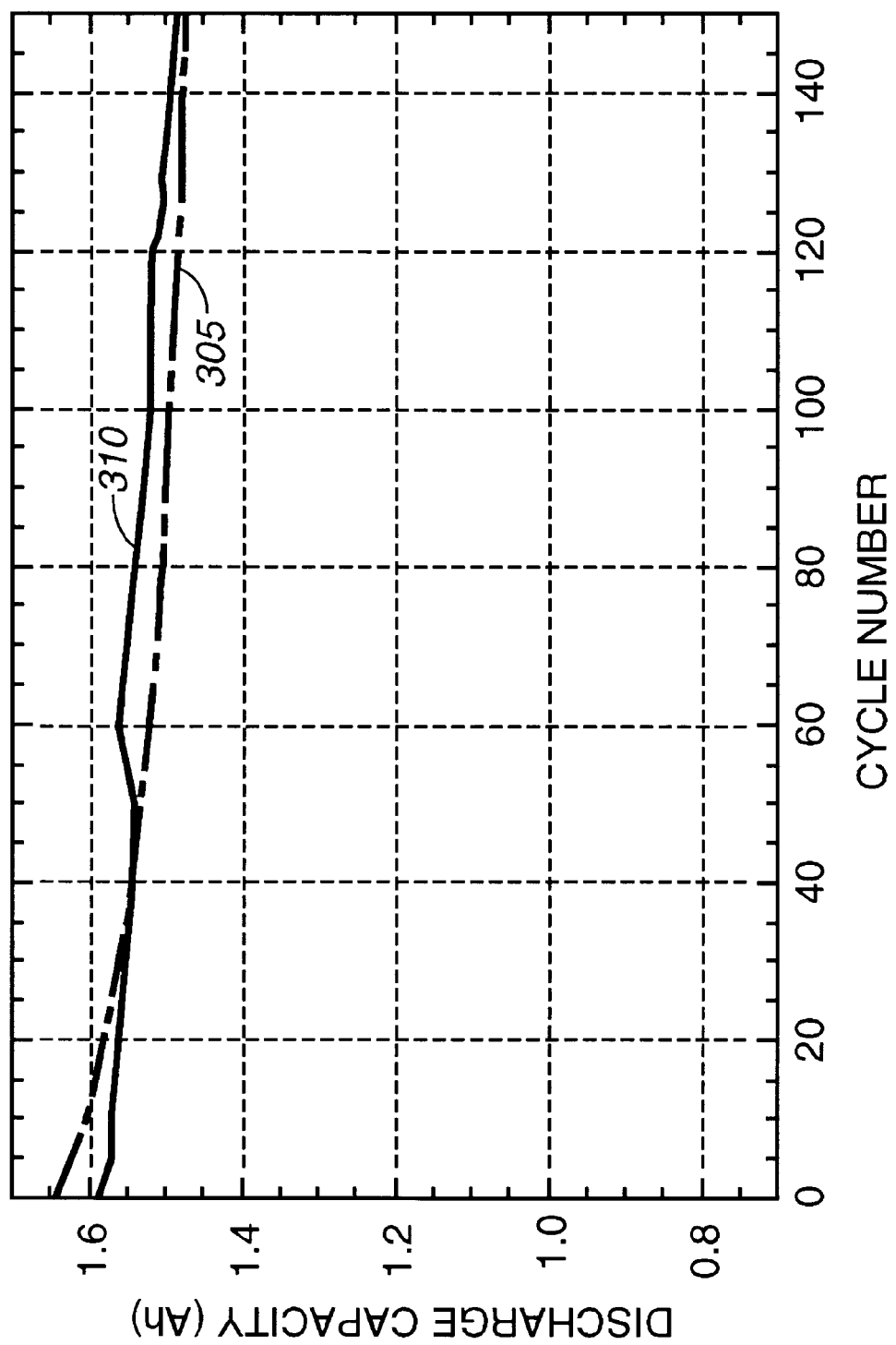
FIGS. 3 and 4 are diagrams of cycling data gathers for cells with washed carbon, in accordance with the instant invention, as compared with a cell with unwashed carbon.
Figure 4:
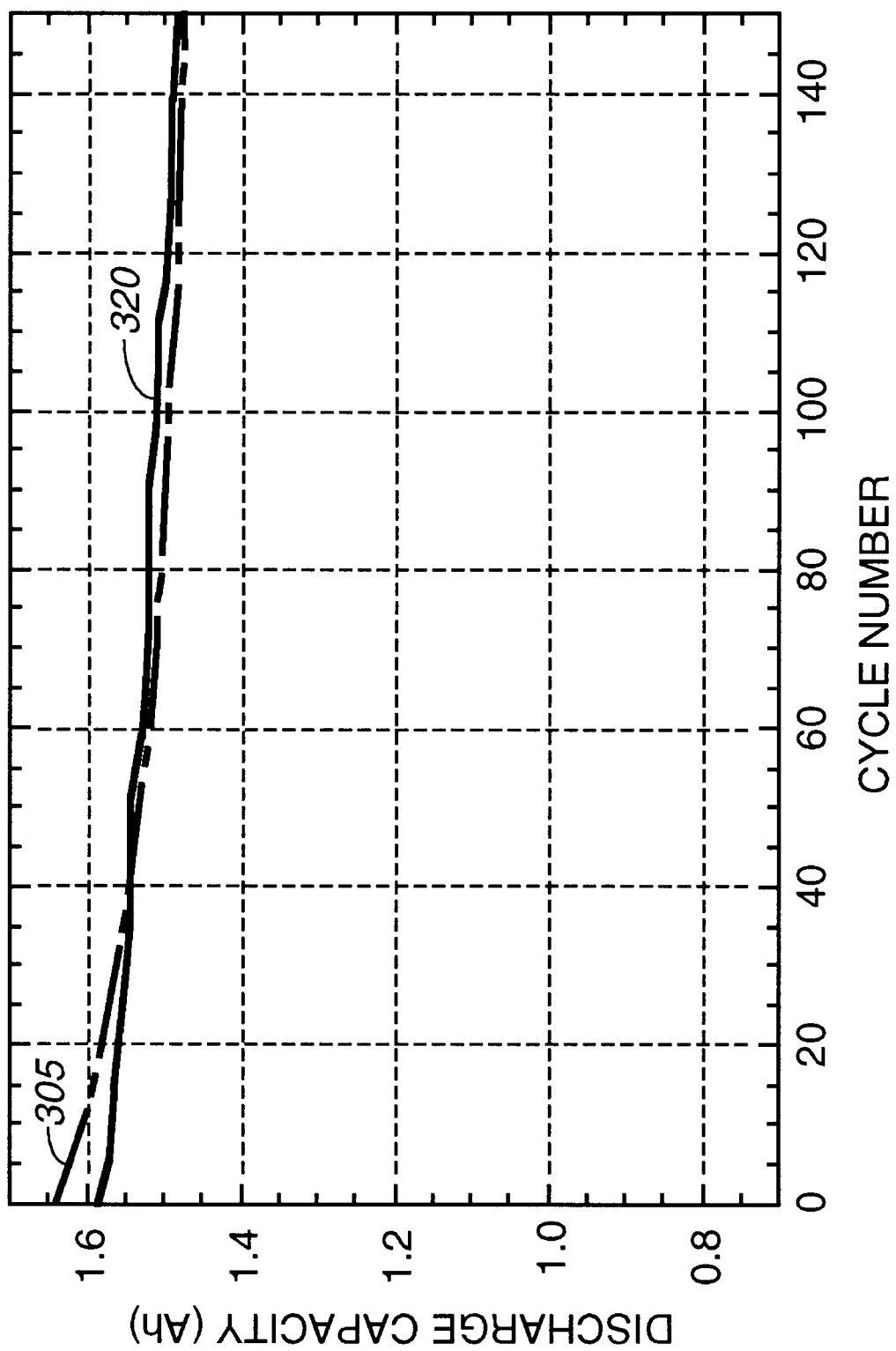

Two standard-sized 18650 cells with $LiNiO_2$ as the positive electrode material and the purified carbon material of Example I as the negative electrode material were fabricated. One 18650 cell was prepared with $LiNiO_2$ as the positive electrode material and unwashed carbon material as the negative electrode material. FIGS. 3 and 4 depict cycling data performed by charging the cells at 1.2 amps to 4.1 volts for a total of 2.5 hours, then discharging the cells at 1.2 amps to 2.5 volts at room temperature, i.e., at about 22° C. In FIGS. 3 and 4, curve 305 corresponds to the cell with unwashed carbon, curve 310 corresponds to a first cell with washed carbon, and curve 320 corresponds to a second cell with washed carbon.

As shown, a large capacity drop during the first 10 to 20 cycles was seen in the cell with the unwashed carbon, although the capacity then became stable. For the cells with the washed carbon, there were no initial capacity drops, and the fading rates of the cells with washed carbon were lower than that of the cell with the unwashed carbon.

In summary, the carbon material as described above is produced by heating a precursor material, such as lignin, to carbonize the material, then comminuting it to result in a carbon material. The carbon material is then washed with acid and deionized water to remove impurities. This carbon material has a capacity that is greater than that of carbon material that has not undergone acid washing. Furthermore, cells fabricated with the purified carbon material as the negative electrode material exhibit significantly improved cycleability over cells made with unpurified carbon.

It will be appreciated by now that there has been provided an improved method for manufacturing a carbon material that has enhanced performance when used for an electrode in an electrochemical cell.

What is claimed is:

1. A method of fabricating a carbon material for use as an electrode in an electrochemical cell, said method comprising the steps of:

carbonizing a lignin material to result in the carbon material; and washing, subsequent to the carbonizing step, the carbon material with acid.

2. The method of claim 1, further comprising, prior to the washing step, the step of:

comminuting the carbon material.

3. The method of claim 1, further comprising, subsequent to the washing step, the steps of:

fabricating a negative electrode using the carbon material; and forming the electrochemical cell to include the negative electrode.

4. The method of claim 1, wherein the washing step comprises the step of:

washing the carbon material with HCl.

5. The method of claim 1, wherein the washing step comprises the steps of:

mixing the carbon material with the acid to form a carbon solution;

heating the carbon solution;

washing residual carbon material with water; and drying the residual carbon material.

6. The method of claim 1, wherein the washing step comprises the steps of:

mixing the carbon material with the acid and deionized water to form a carbon solution;

heating the carbon solution;

washing residual carbon material with water; and drying the residual carbon material.

7. The method of claim 1, wherein the washing step comprises the steps of:

mixing the carbon material with 32% HCl solution and deionized water to form a carbon solution;

heating the carbon solution;

washing residual carbon material with water; and drying the residual carbon material.

8. The method of claim 7, wherein the heating step comprises the step of:

heating the carbon solution at approximately 80° C. for approximately 1 hour.

9. A carbon material for use as an electrode in an electrochemical cell, the carbon material fabricated by a method comprising the steps of:

carbonizing a lignin material to result in the carbon material; and washing, subsequent to the carbonizing step, the carbon material with acid.

10. The carbon material of claim 9, wherein the method for fabricating the carbon material further includes the steps of:

comminuting, prior to the washing step, the carbon material.

11. The carbon material of claim 9, wherein the washing step comprises the steps of:

mixing the carbon material with the acid to form a carbon solution;

heating the carbon solution; and washing residual carbon material with water.

12. An electrode for an electrochemical cell, wherein the electrode is formed by a method comprising the steps of:

carbonizing a lignin material to result in a carbon material;

washing, subsequent to the carbonizing step, the carbon material with acid; and coating the carbon material onto a substrate to form the electrode.

* * * * *